United States Patent

Braune

[11] 4,031,779
[45] June 28, 1977

[54] ROTARY DRIVES

[76] Inventor: Rudi Helmut Braune, Griffin Hill, Thrupp, Stroud, Gloucestershire, England

[22] Filed: Oct. 16, 1975

[21] Appl. No.: 623,093

[52] U.S. Cl. .................................. 74/650; 308/178
[51] Int. Cl.² ........................................ F16H 35/04
[58] Field of Search ................ 308/178, 2; 74/650, 74/691, 695

[56] References Cited

UNITED STATES PATENTS 3,130,604  4/1964  Johnson et al. ..................... 74/650

Primary Examiner—Joseph F. Peters, Jr.
Assistant Examiner—Richard A. Bertsch

Attorney, Agent, or Firm—Young & Thompson

[57] ABSTRACT

A mechanical rotary coupling is provided in which a crown wheel is driven by a drive shaft and is coupled by a floating ring and co-operating ball races and bearings to a thrust cage locked to a hub or a vehicle road wheel. The crown wheel, ring, and cage are mounted on a common shaft and variable axial thrust is applied to the thrust cage to provide variable torque transmission between the crown wheel and the road wheel. The variable thrust is applied by varying the separation of two cams, one of which is fixed and the other of which abuts a thrust race for drive engagement with the thrust cage. The transmission members may be duplicated on the other side of the crown wheel to provide mutual or differential drive to two road wheels.

20 Claims, 4 Drawing Figures

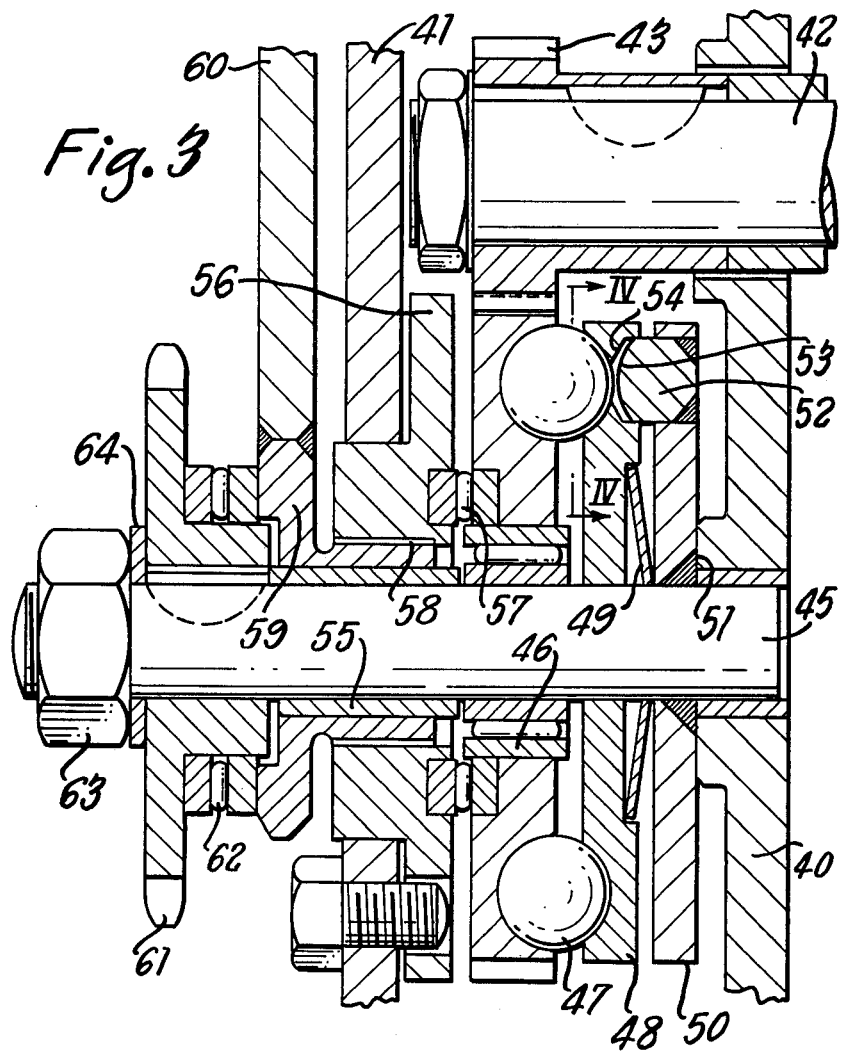
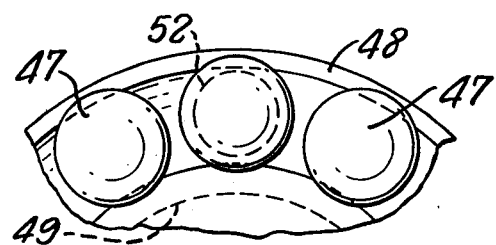

ROTARY DRIVES

The invention relates to rotary drives employing mechanical couplings or cluches, more particularly those in which enggement is effected by axial thrust between two relatively rotatable members.

Conventional couplings of the non-positive type, for example friction couplings, often depend upon the use of mutually engaging high friction surfaces for torque transmission, and where high torques are required the contacting frictional surface areas may be large. The characteristics of such friction couplings demand the use of a separate variable speed gear for efficient speed control.

An object of the present invention is to provide a mechanical rotary coupling engageable by axial thrust and wherein a higher than usual range of speed control is obtainable without auxiliary change speed gearing.

It has been found that controllable torques can be transmitted by axial thrust applied by a rotating driving member having line contact with a number of rolling contact members, which themselves have line contact with a driven member.

According to one feature of the invention a mechanical rotary coupling comprises two coaxial relatively rotatable members, hereinafter also referred to as thrust plates, and means for applying axial thrust to cause interference engagement between respective sets of opposite contact members carried by the coaxial rotary members. The means for applying axial thrust may comprise face cams acting against an auxiliary thrust plate, which, in the case where the contact members are balls or rollers, will again embody a ball bearing or roller bearing race. The term "interference" engagement implies that the area of mutual contact common to the opposite contact members, and whereby the torque is transmitted, is very small relative to the total area of the coaxial rotary members.

In a preferred embodiment a set of contact members carried by at least one of the coaxial thrust plates consists of balls or rollers rotatable with respect to the thrust plate within a bearing race, for example an annular groove in the face thereof. The opposite set of contact members in the other thrust plate are preferably such as to give only line contact with the first set. Again these thrust transmitting contact members may be balls or rollers. In a further example the contact members may have plane surfaces, or curved surfaces other than spherical or cylindrical. The very small area of mutual contact, can be adequate for torque and speed control in particular types of wheeled vehicles, and in certain other applications where positive drives are unnecessary or undesirable.

For example, the principle may be extended to constitute a differential gear by duplicating the arrangement symmetrically about a central gear wheel or crown wheel connected to an input driving shaft. This central driving wheel is flanked by respective pairs of axial thrust plates. In such an arrangement the pairs of thrust plates may have means for selective application of axial thrust singly by cams to one or the other pair, or to both pairs simultaneously. In the case of a wheeled vehicle, such selective control of the axial thrust may be used to effect or assist steering and, in the case of a machine drive, to retard either one or two output shafts with respect to the other.

An example illustrating the general principle of the invention will be now described with reference to the accompanying drawing:

FIG. 3 is a section taken along the axis of another form of rotary drive, having a single output shaft; and FIG. 4 is a part section in the plane IV—IV of FIG. 3.

Figure 1:
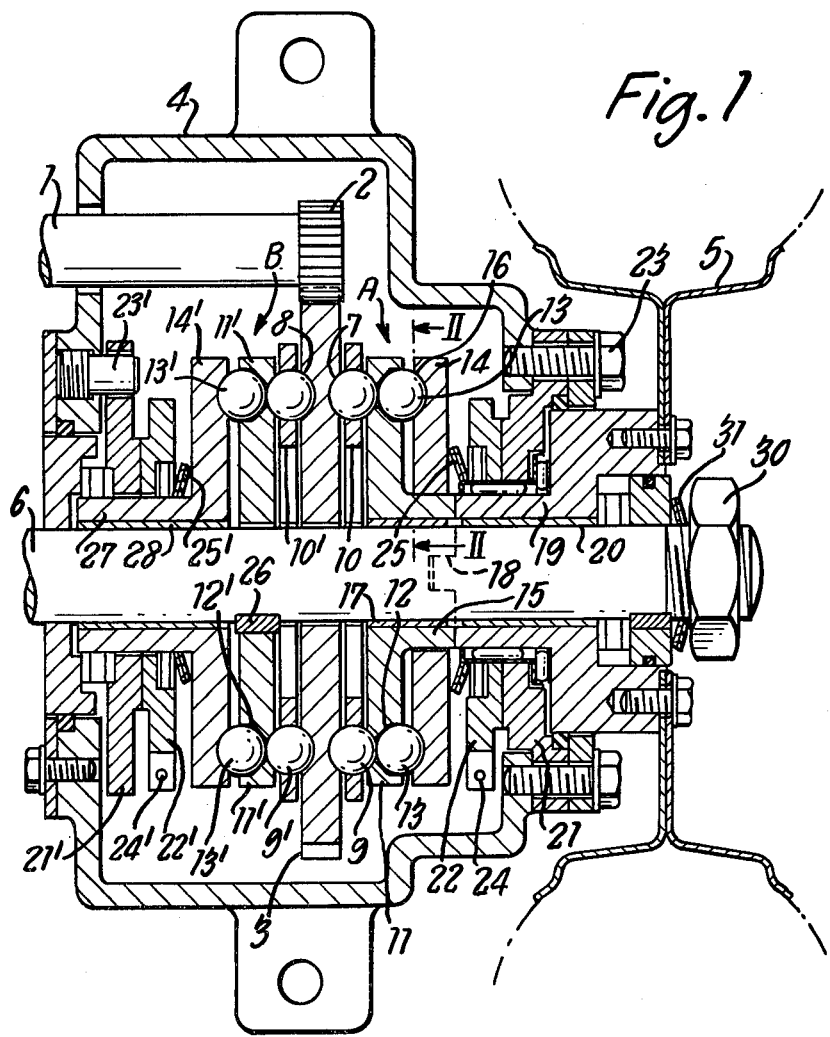
FIG. 1 is a section taken along the axis of one form of a differential gear employing couplings according to the invention for driving a pair of road wheels, and shown in the engaged position.

The arrangement now described with reference to FIGS. 1 and 2 comprises a main input shaft 1 having a pinion 2 driving a differential crown wheel 3 flanked by a pair of similar couplings at opposite sides thereof and indicated by the general references A and B. The transmission and couplings are housed in a fixed enclosing gear case 4, and these drive the respective right and left hand road wheels of which only the right hand wheel 5 is shown here. Since the functioning of both couplings A and B is identical, it will only be necessary to describe in detail the right hand coupling A and the components connected therewith.

Crown wheel 3 is freely rotatable on main transmission shaft 6 and has a pair of annular main ball races 7 and 8 machined in the opposite faces thereof. Considering main ball race 7 a number of balls 9 are generally spaced apart by a floating ring 10 also freely rotatable about shaft 6. An inner thrust cage 11 has a number of pockets 12 carrying a number of freely rotatable balls 13 equal to the opposing balls 9 in race 7 and disposed on the same diameter about the axis of shaft 6.

Balls 13 are supported, at the side remote from crown wheel 3, by an outer thrust race 14 freely rotatable about the hub 15 of thrust cage 11, and having an annular ball race 16 machined in its inner face.

Hub 15 of thrust cage 11 is rotatably mounted by means of bearing liner 17 and is positively coupled by dog clutch 18 to wheel hub 19 of road wheel 5 also rotatably mounted by means of bearing liner 20 on shaft 6.

Between wheel hub 19 and outer thrust race 14 are a pair of face cams 21, 22 of which cam 21 is fixed by set screws 23 and cam 22 is rotatable, for example by a Bowden type cable (not shown) anchored at 24. Axially resilient spring washers 25 apply an idling no-load thrust to outer thrust race 14 when the cams 21, 22 are in the "zero" i.e. unexpanded condition.

The arrangement of coupling B at the left hand side is equivalent in function and the equivalent parts are similarly numbered with indexed reference numerals, the only difference being that inner thrust cage 11' is keyed at 26 to shaft 6, and outer thrust race 14' is rotatably mounted on shaft 6 by means of bushing 27 and bearing liner 28. The left hand road wheel (not shown) is rigidly coupled to the left hand end of shaft 6. This allows the entire assembly to be stabilized by end fixing nut 30 applying, through spring washers 31, an idle running thrust between main race 7 and inner thrust cage 11.

Figure 2:
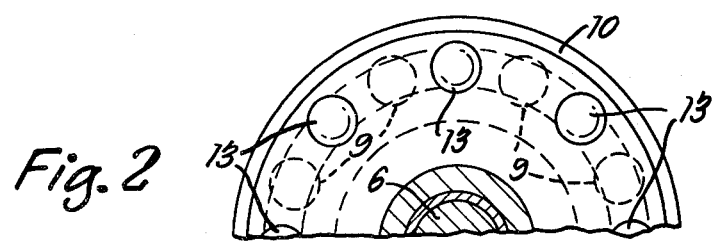
FIG. 2 is a simplified cross section taken at II—II of FIG. 1, but with the coupling balls in the disengaged position.

In the no load condition, shown in FIG. 2, the sets of balls 9 and 13 are circumferentially spaced apart on equal diameters and there is a very small idle running clearance allowing crown wheel 3 to rotate at any desired speed without transmitting any torque other than that to overcome the friction of the race 7 and balls 9.

During this time the balls 9 can oscillate circumferentially between the balls 13, but the axial thrust is insufficient to overcome the resistance offered by the inerference contact between balls. If face cam ring 22 is operated it applies a controllable thrust, which may be predetermined, according to the rise and angular sweep of the cam ring, between race 7 and outer thrust race 14. This causes the balls 9 and 13 to engage, the resistance to slip being sufficient to transmit torque to the wheel 5. It is therefore evident that simultaneous equal thrusts applied by face cams 22 and 22' will cause both road wheels to be driven in straight line ahead motion. Differential thrust on the face cams 22 and 22' will result in one road wheel being retarded with respect to the other. Steering of a vehicle may thus be effected or assisted. In the case of rotating machinery the couplings may differentially control two output shafts.

The principle may be retained with suitable modifications. For example one or both races may have rollers instead of balls, or the inner thrust cages 11 and 11' may have non-rotatable contact members (not shown) with plane or curved contact faces instead of having the rotatable balls 13, 13' or rollers. Again, however, the interference contact will remain as line when the couplings are engaged. The thrust between thrust race 14 and rolling elements 13 is transmitted however, always by line contact and such contact may be maximised by choice of the number and dimensions of the elements. The axial thrust may be controlled by other means than face cams, for example screw threaded sleeves, FIGS. 3 and 4 show respectively a section along the axis and a part section in the plane IV—IV of a rotary drive according to the invention having a single output shaft.

A gear box 40 with cover 41 contains a motor driven input shaft 42 carrying a pinion 43 meshing with gear wheel 44, which is freely rotatable on output shaft 45 via the radial bearing 46. A set of balls 47 are normally free running in opposite ball race grooves, one of which is formed in the face of gear wheel 44 and the other of which is formed on one side of a thrust plate 48, hereinafter also referred to as a clamping race.

The latter is normally lightly loaded against the balls 47 by a disc spring 49 bearing against a back-up plate 50 welded at 51 to the shaft 45. Plate 50 carries a number of pins 52 secured in sockets equidistantly spaced on a circle concentric with the ball races for balls 47. The pins have heads 53 of part spherical or other curvature projecting into a similar number of axially aligned sockets 54 formed in the rear side of the thrust plate 48. The sockets 54 penetrate the ball race groove formed in the front side of thrust plate 48, but in the idle condition the pins 52 have a small clearance from the balls 47. By this arrangement plate 48 is rigidly coupled to back-up plate 50 for rotation, but is relatively axially displaceable within small limits permitted by spring 49.

Secured in the gear box cover 41 is a non-rotatable thrust ring 56, separated from gear wheel 44 by a thrust bearing 57, and having a screw threaded socket at 58 to receive a similarly threaded thrust ring 59, rotatable on bush 55 and operable by a member 60, for example a manual lever. At the front of thrust ring 59 is a sprocket 61 keyed to the output shaft 45 and spaced from member 59 by a thrust bearing 62. The whole is retained by a nut 63 and washer 64. Nut 63 is preadjusted to apply a smally no-load axial thrust on the assembly between the nut and the spring 49.

The assembly can function as a variable axial thrust coupling and an infinitely variable transmission in the following manner. On driving the input shaft 42 the lever 60 being in the idling position, gear wheel 44 rotates and the balls 47, having an idling clearance from the pins 52, transmit zero torque. When lever 60 is operated to the drive position, the increasing axial thrust applied to thrust ring 56 is transmitted as a compression force to all the components between itself and the back-up plate 50. The clearance gap between the balls 47 and pins 52 is thus closed, torque begins to be transmitted to the output shaft 45 and sprocket 61. From this condition further increase of the axial thrust increases the transmittable torque. Once the coupling is engaged the speed may be varied at will. Because the torque is transmitted only by surface interference between the balls 47 and pins 52, the system will automatically stall on overload without any damage.

The pins 52 may be modified in their shape and the curvature of the driving faces 53. The spring 49 may also be replaced by any suitable equivalent element or set of elements. The number of balls 47 may be equal to, or greater than the number of pins 52.

In the transmission hereinbefore described the diametral position of the balls does not change, this being determined by the ball race grooves. The transmission therefore operates always with line contact between the balls and the thrust surface. Moreover, the power transmittable over the required speed range depends on the number of balls used and the chosen dimensions of the components of the system. This represents a practical advantage as compared with some already proposed ball transmissions in which the balls are required to move radially, or are otherwise arranged to have only point contact with a thrust applying surface.

What is claimed is:

1. A mechanical rotary coupling comprising a driving member, a driven member coaxial therewith, a contact member having a bearing surface abutting opposing faces of said driving and driven members, said members being connected together by said contact member, means for applying variable axial thrust between said driving and driven members so as to vary the torque transmitted therebetween, and means arranged to vary said axial thrust during operation of the coupling.

2. A coupling according to claim 1, further comprising a housing for the coupling, and wherein said means for varying the axial thrust between the driving and driven members is operable from outside the housing.

3. A coupling according to claim 2, wherein said thrust varying means is operable by a Bowden cable.

4. A coupling according to claim 2, wherein said thrust varying means is operable by a lever.

5. A coupling according to claim 1, wherein the contact member comprises a ball race having bearings therein, the surfaces of which provides said bearing surface, the driving and driven members having ball races therein arranged to engage said bearings.

6. A coupling according to claim 1, further comprising a shaft, and wherein the driving, driven and contact members are mounted on said shaft.

7. A coupling according to claim 1, comprising a further contact member that abuts an outer face of the driven member and is rotatably engageable therewith.

8. A coupling according to claim 7, wherein the further contact member has a ball race on an inner surface thereof, said ball race having bearings which engage a ball race on the outer surface of said driven member, and wherein the thrust-applying means is arranged to exert thrust on the outer surface of said further contact member.

9. A coupling according to claim 8, wherein the thrust-applying means comprises a pair of cams movable with respect to one another, one of which is engageable with the further contact member.

10. A coupling according to claim 9, wherein the other one of said cams is rigidly connected to the driven member.

11. A coupling according to claim 1, wherein the contact member and the driving member have ball races in respective opposing faces and rotatably engage each other by bearings therein, and wherein the driven member is springloaded away from the contact member and is provided with projections for engaging respective ones of said bearings under the action of said thrust-applying means.

12. A coupling according to claim 1, wherein the driving member is a gear wheel that is rotated by a toothed input drive shaft engaged therewith.

13. A mechanical rotary coupling comprising an annular driving member, two annular driven members, a respective annular contact member disposed between the driving member and the driven members, two further annular contact members respectively disposed beyond said driven members, a shaft upon which said members are mounted, a respective ball race bearing system between opposing faces of said members, and means for applying variable axial thrust between said members to effect mutual or differential rotation of said driven members by said driving member.

14. A coupling according to claim 13, wherein the thrust-applying means comprises means independently operable on each of said further contact members to effect said mutual or differential rotation.

15. A coupling according to claim 14, wherein each thrust-applying means comprises a first cam non-rotatably mounted and a second cam arranged to rotate with said further contact member, said cams having mutually engaging camming surfaces whereby the cams are axially displaceable with respect to each other for transmitting said axial thrust.

16. A coupling according to claim 13, further comprising means arranged to vary said axial thrust between said driving member and respective ones of said driven members during operation of the coupling.

17. A coupling according to claim 16, further comprising a housing for the coupling, and wherein said thrust varying means is operable from outside the housing.

18. A coupling according to claim 7, wherein said thrust varying means is operable by a Bowden cable.

19. A coupling according to claim 7, wherein said thrust varying means is operable by a lever.

20. A mechanical rotary coupling comprising a driving member, a driven member, a contact member having a bearing surface, a shaft, said members being mounted on said shaft with said driven member rigidly connected thereto so as to rotate therewith and said bearing surface abutting opposing faces of said driving and driven members, a further contact member mounted on said shaft and arranged to abut an outer face of said driven member and rotatably engageable therewith, means for applying variable axial thrust between said driving and driven members so as to vary the torque transmitted therebetween and means arranged to vary said axial thrust during the operation of the coupling.

* * * * *